US010776691B1

(12) United States Patent
Ghahramani et al.

(10) Patent No.: US 10,776,691 B1
(45) Date of Patent: Sep. 15, 2020

(54) SYSTEM AND METHOD FOR OPTIMIZING INDIRECT ENCODINGS IN THE LEARNING OF MAPPINGS

(71) Applicant: Uber Technologies, Inc., San Francisco, CA (US)

(72) Inventors: Zoubin Ghahramani, Cambridge (GB); Gary Marcus, New York, NY (US)

(73) Assignee: Uber Technologies, Inc., San Francisco, CA (US)

( * ) Notice: Subject to any disclaimer, the term of this patent is extended or adjusted under 35 U.S.C. 154(b) by 852 days.

(21) Appl. No.: 15/191,363

(22) Filed: Jun. 23, 2016

Related U.S. Application Data

(60) Provisional application No. 62/183,636, filed on Jun. 23, 2015.

(51) Int. Cl.
*G06N 3/08* (2006.01)
*G06N 20/00* (2019.01)

(52) U.S. Cl.
CPC .............. *G06N 3/08* (2013.01); *G06N 20/00* (2019.01)

(58) Field of Classification Search
CPC ................................. G06N 3/08; G06N 20/00
See application file for complete search history.

(56) References Cited

U.S. PATENT DOCUMENTS

| 2010/0223258 | A1  | 9/2010 | Ghahramani et al. | |
|---|---|---|---|---|
| 2016/0148078 | A1* | 5/2016 | Shen | G06K 9/66 382/158 |
| 2016/0189010 | A1* | 6/2016 | Tang | G06K 9/66 382/113 |

OTHER PUBLICATIONS

Doolan, "Using indirect encoding in neural networks to solve supervised machine learning tasks", Apr. 20, 2015, Master's Thesis, University of Amsterdam, The Netherlands, pp. 1-42 (Year: 2015).*
Dahl et al., "Improving Deep Neural Networks for LVCSR Using Rectified Linear Units and Dropout", May 26-31, 2013 IEEE International Conference on Acoustics, Speech and Signal Processing, pp. 8609-8613 (Year: 2013).*
Bengio et al., "Greedy Layer-Wise Training of Deep Networks", 2006, Proc. Advances in Neural Information Processing Systems 19, pp. 1-8 (Year: 2006).*
Lusk, "Evolving Neural Networks With Hyperneat and Online Training", May 2014, A thesis submitted to the Graduate Council of Texas State University, pp. 1-168 (Year: 2014).*
David Rumelhart et. al, Learning representations by back-propagating errors. Oct. 19, 1986, Nature 323:533536.
Kenneth O. Stanley et. al, A hypercube-based encoding for evolving large-scale neural networks, Artificial Life, 2009, 15(2):185-212.
Kenneth O. Stanley et. al, Compositional pattern producing networks: A novel abstraction of development. Genetic Programming and Evolvable Machines, May 10, 2007, 8(2):131-162.

(Continued)

*Primary Examiner* — Robert A Cassity
*Assistant Examiner* — Brent Johnston Hoover
(74) *Attorney, Agent, or Firm* — Fenwick & West LLP

(57) ABSTRACT

Methods, systems and apparatuses, including computer programs encoded on computer storage media, are provided for learning or optimizing an indirect encoding of a mapping from digitally-encoded input arrays to digitally-encoded output arrays, with numerous technical advantages in terms of efficiency and effectiveness.

37 Claims, 7 Drawing Sheets

(56) References Cited

OTHER PUBLICATIONS

Michael C. Mozer, A Focused Backpropagation Algorithm for Temporal Pattern Recognition, Complex Systems, 1989, 3(4):349-381.
Timothy F. Doolan, Using indirect encoding in neural networks to solve supervised machine learning tasks, Master's Thesis, Apr. 20, 2015, University of Amsterdam, The Netherlands.
Yann Lecun et. al, Backpropagation Applied to Handwritten Zip Code Recognition, Neural Computation, Jul. 7, 1989, 1(4):541-551.
Yann Lecun, Deep learning, May 28, 2015, Nature, 521:436-444.

* cited by examiner

SYSTEM AND METHOD FOR OPTIMIZING INDIRECT ENCODINGS IN THE LEARNING OF MAPPINGS

CROSS-REFERENCE TO RELATED APPLICATIONS

The present application claims benefit of priority to U.S. Provisional Patent Application Ser. No. 62/183,636, titled "System and Method for Optimizing Indirect Encodings in the Learning of Mappings," filed Jun. 23, 2015, which is incorporated by reference herein in its entirety.

BACKGROUND

This specification relates generally to machine learning and more specifically to systems and methods for training mappings, such as neural networks, via optimization of an indirect encoding to minimize an error metric or maximize an objective function.

Many problems in machine learning, statistics, data science, pattern recognition, and artificial intelligence involve the representation and learning of mappings. Examples of such mappings include, for example: pixel to pixel mappings for image denoising; image to object label mappings for image recognition; language to language word and/or sentence mappings for language translation; mappings of camera inputs to steering direction for self-driving vehicles; and mappings of states of a game to actions required to win the game.

A mapping may be expressed as follows, using the notation x for exemplary inputs to a mapping, y for the outputs of the mapping, and f for the mapping itself:

$$y=f(x)$$

Mappings can be deterministic or probabilistic, where the latter means that for any given inputs, a mapping may map to several possible output values with corresponding probabilities. A special case of deterministic mappings is functions, which map from single input values to single output values.

Mappings employed in fields such as machine learning, statistics, data science, pattern recognition and artificial intelligence are often defined in terms of a collection of mapping parameters or weights w, $$Y=f(x,w).$$

The relationship between a mapping and its given parameters is often (but not always) smooth, such that small changes to the parameters result in a correspondingly small change in the mapping. As a simple example, if the mapping is linear then the parameters may correspond to the slope and intercept parameters of the line. Such parametric mappings of inputs to outputs are especially useful for unknown mappings, which must be learned from example data.

Neural networks are often employed in industry and academia for the representation and learning of mappings from input data. See, e.g., Rumelhart et. al, Learning representations by back-propagating errors, *Nature*, 323:533-536, 1986 (incorporated by reference herein in its entirety). For example, neural networks are widely used in areas such as: data classification, pattern recognition, segmentation of images to objects, image denoising, motion planning, self-driving vehicles and automated game play, to name a few.

An exemplary neural network mapping is illustrated in FIG. 1. The exemplary neural network 100 may be employed for learning and representing a mapping of a two-dimensional ("2D") digitally-encoded array of inputs 110 having P×P dimension to a 2D digitally-encoded array of outputs 150 having dimensions Q×Q. The input 110 may be, for example, a pixelated image with P×P pixels, and the output 150 may similarly be a pixelated image with Q×Q pixels. Accordingly, such a neural network may map images to images, and may be useful for image segmentation, detection, classification, de-noising, super-resolution, normalization, and other tasks. Although a 2D input and output array are shown, it will be recognized that neural networks may be employed to map higher dimensional arrays (e.g., voxels in a 3D scan) or lower dimensional arrays (e.g., a 1D array representing possible labels of an image or possible words from a vocabulary of words).

As shown, the mapping 100 comprises three fully-connected layers, including an input layer 110, a hidden layer 130 and an output layer 150. As shown, the input layer 110 is formed by a plurality of input nodes or units 111. For example, the input layer may comprise an array storing certain properties or characteristics of underlying data (e.g., pixel information of a digital image).

The hidden layer 130 is also formed by a plurality of processing units 131. The hidden layer 130 comprises weighted connections (i.e., mapping parameters) 121 from the input layer. For example, mapping parameter 121 connects input layer unit 111 to hidden layer unit 131. When processing the weighted input information from the input layer 110, each unit in the hidden layer 130 computes the data it receives and presents the result to each of the units in the next layer (here, the output layer 150).

The neural network 100 further comprises an output layer 150 that is similarly formed by one or more output nodes 151. The output layer 150 is connected to the hidden layer 130 via a number of mapping parameters 141 from the hidden layer. For example, mapping parameter 141 connects hidden layer unit 131 to output layer unit 151. Typically, this type of architecture will have a separate, independently-tunable mapping parameter (e.g., 121, 141) connecting each unit in one layer to each unit in the subsequent layer.

The mapping of a neural network having a number of layers L can generally be expressed as:

$$y=f(x)=f_L(f_{L-1}\ldots(f_1(x)))$$

where $f_l$ denotes the mapping computed by a given layer, l.

The L layer network may be expressed as follows, where the input x to the mapping f is a vector of inputs, with $x_i$ denoting a given element i of the vector; $h^{(l)}$ represents hidden vectors in a given layer l of the mapping; the output y is a vector of outputs of the mapping, with $y_j$ representing a given element j of the vector of outputs; and $\sigma_1, \ldots, \sigma_l, \ldots, \sigma_L$ represents the transformations in each layer.

$$h_r^{(1)} = \sigma_1\left(\sum_i w_{ri}^{(1)} x_i\right)$$

$$h_k^{(l)} = \sigma_l\left(\sum_r w_{kr}^{(l)} h_r^{(l-1)}\right)$$

$$y_j = \sigma_L\left(\sum_k w_{jk}^{(L)} h_k^{(L-1)}\right)$$

There are many known transformation or activation functions, such as sigmoid logistic, hyperbolic tangent (tan h), rectified linear (ReLU), and other linear or nonlinear functions.

The mapping parameters w correspond to the collection of mapping parameters $\{w^{(1)}, \ldots, w^{(L)}\}$ defining the neural network, each being a matrix of mapping parameters for each layer. The parameters are usually represented by numbers specifying the strength of connections between the units in the network. For example, a parameter $w_{ij}$ having a value of zero represents that the unit j has no effect on unit i, while a large positive or negative parameter value may represent large effects of units on other units.

The "learning" or "training" of a neural networks refers to altering or changing the parameters in the network, typically with the goal of improving the overall performance of the network. The problem of learning a neural network (i.e., determining the specific parameters to be used) is an example of the more general problem of learning a mapping from data. Given a training data set D comprising a number N of examples of pairs of input and corresponding output observations (i.e., $D=\{(x_1, y_1) \ldots, (x_N, y_N)\}$), the goal may be to learn a mapping that approximates the mapping on the training set and, importantly, also generalizes and/or extrapolates well to unseen test data $D_{test}$ drawn from the same probability distribution as the pairs in the training data set D.

To learn such a mapping, an error function E is typically defined, where the error function may measure the positive utility (in the case of an objective function) or the negative utility (in the case of a loss function) of a mapping that provides an output y' from input x when the desired output is y:

$$l(y,y')$$

When the error function E is a loss function, the error on a given training data set may be defined for a mapping $f(x,w)$ as the sum of the losses (i.e., empirical loss), as shown in Equation (1) below.

$$E(w,D)=\Sigma_{n=1}^{N}l(y_n,f(x_n,w)) \quad (1)$$

Such an error function can be minimized, for example, by starting from some initial parameter values $w_o$ and then taking partial derivatives of $E(w,D)$ with respect to the parameters w and adjusting w in the direction given by these derivatives (e.g., according to the steepest descent optimization algorithm shown in Equation (2), below).

$$w_t \leftarrow w_{t-1} - \eta_t \left.\frac{\partial E(w, D)}{\partial w}\right|_{w_{t-1}} \quad (2)$$

Many variations on this error function E are possible, including versions that include regularization terms that prevent overfitting to the training data, versions of E derived from likelihoods or posteriors of probabilistic models, versions of E that are based on sub-sampling very large data sets (i.e. for applications where the number of data points N is large), or other approximations to the loss function of interest (so called "surrogate loss functions").

The common components of the above framework are that the goal is to learn a mapping f, that the mapping is parameterized by a number of mapping parameters w, learning occurs based on some example data D, by optimizing some error function E, using some optimization algorithm, which usually employs information about how E changes as a function of w. Any number of optimization algorithms may be employed, including, for example, the use of stochastic gradients, variable adaptive step-sizes, $\eta\_t$, second-order derivatives, approximations thereof and/or combinations thereof. It will be appreciated that the above framework may be employed to optimize error functions whether such optimization requires minimizing an error value corresponding to a loss function or maximizing an error value corresponding to an objective function. These problems are considered to be equivalent.

One problem associated with training mappings is that the number of independently tunable parameters grows exponentially with the number of dimensions of the input and output arrays. For example, the number of parameters in a 2D×2D mapping of an input array and output array each having K elements per dimension grows by $K^4$. Unfortunately, mappings with even modest numbers of parameters quickly become impractical for pattern recognition and other problems due to exceedingly long training times, high memory requirements, and sample complexity.

Convolutional networks (or convolutional layers) represent one partial solution to this problem. Generally, such networks comprise convolutional layers having a number of nodes that produce an activation by convolving received inputs in accordance with a set of parameters for each unit. Unlike the fully-connected layers of the exemplary neural network described above, each unit in a convolutional layer receives an input from only a portion of the units in the preceding layer. And one or more units in each layer are typically configured to share the same parameters. See, e.g., LeCun et. al, Backpropagation Applied To Handwritten Zip Code Recognition. *Neural Computation,* 1(4):541-551, 1989 (incorporated by reference herein in its entirety).

By tying mapping parameters together according to translationally invariant convolutional operators, convolutional neural networks offer some reduction in the number of independently-adjustable parameters. Unfortunately, convolutional layers are inflexible and allow only one particular way of tying mapping parameters corresponding to representing only invariance to translation. Convolutional layers are thus not an efficient way of encoding many learning problems.

Another partial solution to this problem is the indirect encoding of a mapping. As discussed above, a mapping f generally processes some input data x according to $y=f(x,w)$. In the case of indirect encodings, a second mapping g (i.e., an "indirect encoding") is employed to determine the mapping parameters w of the first mapping.

If the mapping parameters w are themselves a function of some intrinsic dimensions of the mapping z, such parameters may be represented as $w=g(z,v)$, where the indirect encoding g itself comprises one or more parameters v (i.e., "indirect encoding parameters"). The mapping parameters w are said to be indirectly encoded, because they are functions of the indirect encoding (i.e., they are not independently adjustable).

As with the conventional mappings discussed above, an indirectly encoded mapping may be learned by defining an error representing the discrepancy between an output of the mapping for a given input and a correct or expected output (see Equation (1), above). The ideal mapping parameters w may then be learned by optimizing the error (e.g., according to Equation (2), above).

One exemplary indirect encoding technique is Hypercube-based NeuroEvolution of Augmenting Topologies ("HyperNEAT"), an evolutionary algorithm for evolving large-scale neural networks using indirect encodings called Compositional Pattern Producing Networks ("CPPNs"). See, e.g., Stanley et. al, Compositional Pattern Producing Networks: A Novel Abstraction of Development, *Genetic Programming and Evolvable Machines,* 8(2): 131-162, 2007 (incorporated by reference herein in its entirety); and Stanley et. al, A Hypercube-Based Indirect Encoding For Evolving Large-Scale Neural Networks, *Artificial Life,* 15(2): 185-212, 2009 (incorporated by reference herein in its entirety). In such indirect encodings, the CPPN generally consists of a small number of different types of neurons encoding different patterns of weights in the neural network. The types and weights of the CPPN neurons are learned using evolutionary algorithms guided by a fitness function.

Although Stanley's evolutionary algorithms allow for a reduction in independently tunable mapping parameters, such algorithms have proved exceedingly inefficient to train. Accordingly, they are impractical for real world applications that involve large data sets and/or complex mappings.

Recently, an extension has been developed for the Hyper-NEAT neural network, where the neural network and the CPPN are separately optimized using backpropagation. See, e.g., Doolan, Using Indirect Encoding in Neural Networks to Solve Supervised Machine Learning Tasks, Master's thesis, University of Amsterdam, The Netherlands, 2015 (incorporated by reference herein in its entirety). Doolan's method alternates between learning the CPPN and the neural network, but fails to achieve any significant improvements on the state-of-the-art. Indeed, such methods are unacceptable for real world applications, as the proposed alternating procedure for optimization of the HyperNeat error function is not guaranteed to converge.

With the recent advent of large data sets ("big data"), more efficient learning techniques are required. It would be beneficial if indirect encodings could be efficiently trained to encode complex mappings, as such encodings may significantly reduce independently adjustable mapping parameters by taking advantage of, and accurately representing, any geometric structure and/or regularity of encoded mappings.

SUMMARY

In accordance with the foregoing objectives and others, exemplary methods and systems are disclosed herein to efficiently optimize indirect encodings of mappings, such as deeply-layered neural networks, to minimize an error metric or maximize an objective function. The indirect encodings may be employed to encode one or more parameters of a given mapping, thereby reducing the number of independently adjustable parameters required for the mapping. By employing an indirect encoding in concert with a given mapping and, in particular, by communicating error information from the mapping to the indirect encoding, mappings may be trained significantly faster and with less data than otherwise similar mappings that do not employ the disclosed indirect encoding techniques.

In one embodiment, a computer-implemented method is provided wherein an indirect encoding is employed to determine parameter information corresponding to one or more mapping parameters of a mapping. Such parameter information may be determined based on relationship information, such as but not limited to, mapping parameter location information, mapping geometry information, input data information, task information, and/or combinations thereof. For example, relationship information may include mapping parameter location information such as, but not limited to, a location of an input to the mapping parameter, a location of an output of the mapping parameter, a position of a layer to which the mapping parameter is associated, a position of a filter to which the mapping parameter is associated, and/or combinations thereof.

The method may further include updating the mapping parameter(s), based on the determined parameter information. Such updating may include adding, multiplying, interleaving, replacing and/or combining the determined parameter information and the mapping parameter(s). An output may then be calculated via the mapping, based on received input data and the updated mapping parameter(s). An error value of the output may be determined, wherein the error value is based on an error function and/or an expected output.

The determined error value and error function may be employed to adjust one or more indirect encoding parameters of the indirect encoding. For example, the adjusting may be based on error derivative information of the error function. Such error derivative information may include a derivative of the error function with respect to the mapping parameter.

The method may also include determining that a predetermined stopping criterion is not met and repeating one or more of the above described steps. Each of such steps (or any subset thereof) may be repeated until the predetermined stopping criterion is met. Exemplary stopping criteria include, but are not limited to, a number of runs and/or a criterion based on the error value.

In another embodiment, a system is provided including one or more computers and one or more storage devices storing instructions that when executed by the one or more computers cause the one or more computers to perform operations including: determining, via an indirect encoding, parameter information corresponding to a mapping parameter of a mapping, based on received relationship information relating to the mapping; updating the mapping parameter, based on the determined parameter information; calculating, via the mapping, an output, based on received input data and the mapping parameter; determining an error value of the output, the error value based on an error function and an expected output; and adjusting one or more indirect encoding parameters of the indirect encoding, based on the determined error value and the error function. The performed operations may further include repeating one or more of the above steps until a predetermined stopping criterion is reached.

In yet another embodiment, a computer program product encoded on one or more non-transitory computer storage media is provided. The computer program product includes instructions that when executed by one or more computers cause the one or more computers to perform operations including: determining, via an indirect encoding, parameter information corresponding to a mapping parameter of a mapping, based on received relationship information relating to the mapping; updating the mapping parameter, based on the determined parameter information; calculating, via the mapping, an output, based on received input data and the mapping parameter; determining an error value of the output, the error value based on an error function and an expected output; adjusting one or more indirect encoding parameters of the indirect encoding, based on the determined error value and the error function; and, if a predetermined stopping criterion is not reached, repeating one or more of the above steps.

In another embodiment, a computer-implemented method is provided. The method includes providing a neural network mapping having a first layer with one or more units, a second layer with one or more units, and a first set of mapping parameters connecting one or more of the first layer units to one or more of the second layer units. The method further includes determining, via an indirect encoding, parameter information corresponding to one or more of the mapping parameters, wherein said determining is based on received relationship information relating to the mapping. The method also includes: updating the one or more mapping parameters, based on the determined parameter information; calculating, via the mapping, an output, based on received input data and the one or more updated mapping parameters; determining an error value of the output, the error value based on an error function and an expected output; and adjusting one or more indirect encoding parameters of the indirect encoding, based on the determined error value and the error function.

The method may optionally include: providing a neural network mapping having an additional third layer with a plurality of units and a second set of mapping parameters connecting one or more of the second layer units to one or more of the third layer units, wherein each of the updated mapping parameters are associated with the first set of mapping parameters, the second set of mapping parameters, or both sets of mapping parameters.

In yet another embodiment, a computer-implemented method is provided, including: determining, via an indirect encoding, parameter information corresponding to one or more mapping parameters of a mapping, based on relationship information corresponding to the mapping; updating the one or more mapping parameters, based on the corresponding parameter information; providing input training data to the mapping to calculate an output; determining an error value of the output, the error value based on an error function and an expected output; and/or adjusting one or more indirect encoding parameters of the indirect encoding, based on the determined error value and derivative information of the error function.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Various methods and systems are disclosed to efficiently train and/or optimize mappings via the learning of indirect encodings of such mappings. Exemplary indirect encoding techniques described herein may employ indirect encodings to encode one or more parameters of a given mapping, thereby reducing the number of independently-adjustable mapping parameters required for any given mapping. Moreover, unlike currently known evolutionary algorithms, the embodiments described in the instant specification allow for efficient learning of indirect encodings and faster optimization of encoded mappings with less test data, as compared to otherwise similar mappings that are not indirectly encoded and existing evolutionary algorithms. Accordingly, the disclosed indirect encoding techniques are scalable to large scale problems in fields such as artificial intelligence and machine learning.

The disclosed indirect encoding techniques may be employed to efficiently learn nearly any type of mapping, in continuous and/or discrete forms. Exemplary techniques allow for improvements to systems and methods for transforming digitally-represented arrays, such as images or text files, to other digitally-represented arrays. These transformations have numerous applications, including segmentation of images into objects, classification of images, image denoising, predicting the next frame of a visual scene from previous frames for motion planning, robotics and automated computer-game-play. The indirect encoding techniques may additionally be applied to learn mappings, such as but not limited to: mappings between robotic position sensors measurements to motor commands for robot end-effectors; mappings between camera inputs and other sensors on a self-driving vehicle to steering direction and other automobile controls; and/or to mappings between sentences and their meanings.

It has surprisingly been found that indirect encodings may be efficiently learned for a given encoded mapping by propagating error information from the mapping to the indirect encoding. As discussed in detail below, such error information may include, but is not limited to, an error value (e.g., as determined by comparing an output of the mapping to an expected output), a form of an error function used to determine the error value, and/or error derivative information relating to the error function (e.g., a derivative of the error function with respect to one or more indirect encoding parameters of the indirect encoding).

Figure 1:
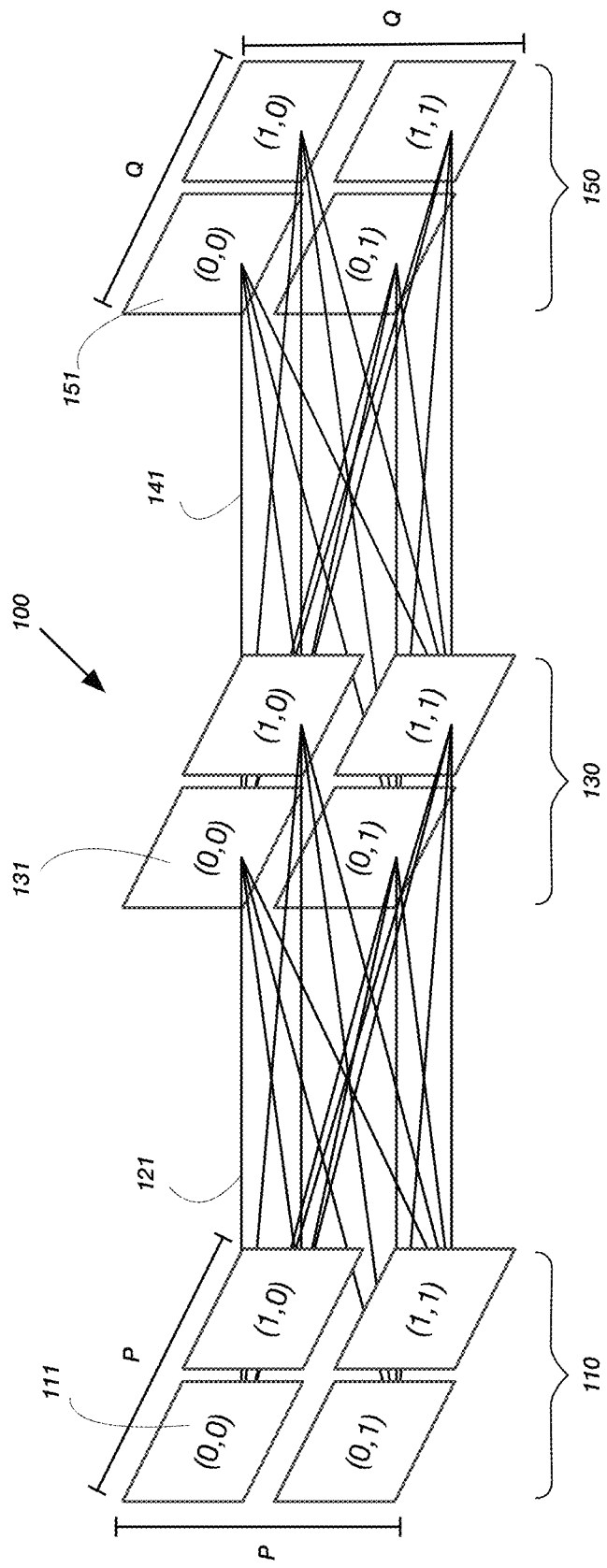
FIG. 1 shows an exemplary mapping having an input layer 110, hidden layer 130, and output layer 150, where each layer is fully connected by a plurality of mapping parameters (121, 141).
Figure 2:
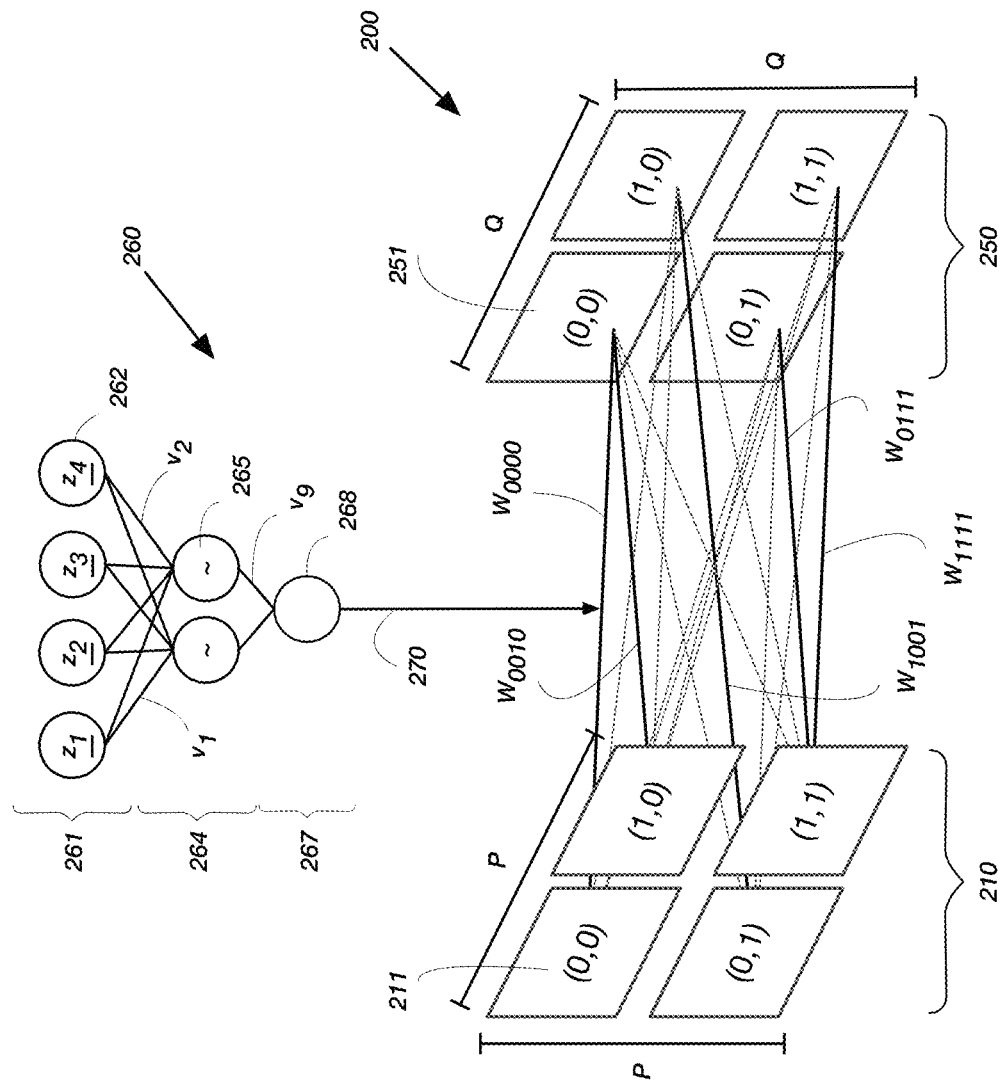
FIG. 2 shows an exemplary indirect encoding 260 as encoding one or more mapping parameters (e.g., $w_{0010}$, $w_{0000}$, $w_{1001}$, $w_{1111}$) of a mapping, such as the mapping shown in FIG. 1.

Referring to FIG. 2, an indirect encoding is illustrated as encoding a mapping 200. As shown, the mapping may comprise an input layer 210 and an output layer 250, where each layer comprises a plurality of units (e.g., 211 and 251, respectively). A number of mapping parameters (e.g., $w_{0010}$, $w_{0000}$, $w_{1001}$, $w_{1111}$, won) are shown to connect the units in the input layer 210 to the units in the output layer 250. Unlike FIG. 1, these mapping parameters are not independently adjustable. Rather, as explained below, the parameters are encoded via an indirect encoding 260.

As shown, the indirect encoding 260 may comprise a neural network having any number of layers. For example, the indirect encoding may comprise an input layer 261, any number of hidden layers 264, and an output layer 267, where each layer comprises one or more units (e.g., 262, 265, and 268, respectively). The indirect encoding 260 comprises one or more indirect encoding parameters ($v_1$, $v_2$, $v_9$, etc.) connecting the units in each layer to one or more units in subsequent layers. Although shown as a neural network, it will be appreciated that the indirect encoding 260 may comprise any learnable function, as discussed below.

Generally, relationship information may be provided as input to the input layer 261 of the indirect encoding 260 such that mapping parameter information 270 may be determined for one or more mapping parameters to be encoded (e.g., $w_{0010}$, $w_{0000}$, $w_{1001}$, $w_{1111}$). The determined mapping parameter information may be output by the indirect encoding 260, for example at one or more units 268 in the output layer 267. It will be appreciated that mapping parameter information 270 may be determined based on relationship information received by the indirect encoding and the one or more indirect encoding parameters. As discussed in detail below, the parameter information may be employed to encode and/or update a corresponding mapping parameter, such as by adding, multiplying, interleaving, replacing and/or combining the determined parameter information and the mapping parameter.

In certain embodiments, relationship information may include location information corresponding to one or more mapping parameters to be encoded. A mapping parameter's location information may correspond, for example, to the relative position of the parameter within a mapping (i.e., its intrinsic coordinates). Such location information may include, but is not limited to: a relative position of an input to the parameter within the mapping (e.g., intrinsic coordinates of an input unit); a relative position of an output to the parameter within the mapping (e.g., intrinsic coordinates of an output unit); a relative layer or depth to which the input unit, output unit and/or parameter itself belongs within the mapping; and/or a relative position of a filter to which the input unit, output unit and/or parameter itself belongs within the mapping. It will be appreciated that parameter location information may be defined in various ways, as long as each mapping parameter is uniquely identifiable.

Although relationship information typically includes mapping parameter location information, it is not so limited. The relationship information input to a given indirect encoding may further include any other information relevant to a given mapping, such as information relating to the input data to be mapped and/or information relating to a learning problem or task to be solved by the mapping. More specifically, relationship information may comprise location information of one or more mapping parameters, input data information and/or task information.

In certain embodiments, mapping geometry information may be transmitted or otherwise introduced to one or more indirect encodings. Such information relates to the geometric structure of the mapping, including and may include, but is not limited to, various forms of smooth variation of parameters in each layer of the mapping.

Indirect encodings can represent a variety of relationships in the input data (i.e., the data to be input into the mapping—not the indirect encoding). Accordingly, input data relationship information may be introduced to exemplary indirect encodings. Such information may include, for example, information relating to features of the input data and features of transformations of the input data. More specifically, such input data relationship information may include: input data geometry; patterns of symmetry (e.g. left-right symmetry); noisy forms of symmetry; periodic or nearly periodic repetition; and/or combinations thereof.

In certain embodiments, an indirect encoding may be employed to encode mappings that map a plurality of different, but related tasks. In such embodiments, task information relating to the particular task to be solved may be input to the indirect encoding in order to determine parameter information corresponding to one or more mapping parameters (e.g., mapping parameters that are specific to the particular task).

As an example, a single mapping may be employed to map movements for tennis and squash. In this case, a binary input may be introduced to the indirect encoding to indicate which task (tennis or squash) should be solved. Such a multi-task learning configuration may be more efficient than learning two separate mappings.

Still referring to FIG. 2, the illustrated indirect encoding architecture may be employed, for example, to map an input image to an output image. An input image may comprise a 2D, P×P array of pixel values and the output image may comprise a 2D, Q×Q array of pixel values.

In this example, the input array x may be indexed by $x_{ij}$ where $i \in \{1, \ldots, P\}$ and $j \in \{1, \ldots, P\}$ are indices of the array, and each $x_{ij}$ element stores pixel information. Similarly, the output array y of the mapping f may be indexed by $y_{kl}$ where $k \in \{1, \ldots, Q\}$ and $l \in \{1, \ldots, Q\}$ are indices of the array, and each $y_{kl}$ element stores pixel information. Accordingly, a mapping computed by this network, for element (k,l) of the output may be represented by Equation (3) below.

$$y_{kl} = \sigma(\Sigma_{i=1}^{P} \Sigma_{j=1}^{P} w_{klij} x_{ij}) \quad (3)$$

It will be recognized that both the input and output are arrays of image pixels and are thus functions of another variable—indexed pixel spatial location. Accordingly, an indirect encoding g may be employed to model mapping parameter $w_{klij}$ as a function of its location information (i.e., intrinsic coordinates) z, and having indirect encoding parameters v, as $w = g(z,v)$.

A unique set of intrinsic coordinates may be determined for each mapping parameter $w_{klij}$ in the mapping by defining: $z_1 = k/Q$, $z_2 = l/Q$, $z_3 = i/P$, and $z_4 = j/P$. And each of these z variables may lie between 0 and 1, even if the input or output arrays contain elements with infinitely high input or output resolution. Thus, an indirect encoding g having indirect encoding parameters v may require only four numbers as input $z = z_1, z_2, z_3, z_4$ to produce a single output w. This indirect encoding from just four numbers to one number may fully specify the array of mapping parameters w in the mapping 200 (e.g., as computed in Equation (3)). In other words, mapping parameter information 270 may be uniquely determined for one, some or all mapping parameters of the mapping 200, even if the mapping includes recurrent connections. For example, substituting the above definitions, it follows that $w_{klij} = w(z,v) = g((z_1,z_2,z_3,z_4), v) = g((k/Q, l/Q, i/P, j/P), v)$. Repeating this for any choice of klij, it will be recognized that the indirect encoding parameters v may uniquely encode each and every mapping parameter w in the mapping (e.g., $w_{0010}$, $w_{0000}$, $w_{1001}$, $w_{1111}$, $w_{0111}$, etc.).

In certain embodiments, it may be useful to model the inputs and outputs of above Equation (3) as continuous functions. The mapping f comprises an input $x(z_1,z_2)$, an output $y(z_3,z_4)$, and a mapping parameter represented as a 4D function $w(z_1, z_2, z_3, z_4)$, which is itself encoded via an indirect encoding g, as described above. Accordingly, the summation in Equation (3) may be replaced with an integration, as shown below in Equation (4).

$$y(z_3,z_4) = \sigma(\iint w(z_1,z_2,z_3,z_4) x(z_1,z_2) dz_1 dz_2) \quad (4)$$

where σ is any approximately or exactly differentiable nonlinear function.

The above Equation (4) generalizes a discrete network, where the inputs may be modeled as a discrete function:

$$x(z_1,z_2) = \Sigma_{i=1}^{I} \Sigma_{j=1}^{J} x_{ij} \delta(z_1^i, z_2^j)$$

where $x_{ij}$ is the activity of input (i,j), and δ is a Dirac delta function. Similarly $y_k$ corresponds to unit kl of the output. In this case, the above double integral in Equation (4) becomes a double sum, as shown in Equation (5) below.

$$y_{kl} = y(z_3^k, z_4^l) = \sigma(\Sigma_{i=1}^I \Sigma_{j=1}^J w(z_1^i, z_2^j, z_3^k, z_4^l) x_{ij}) \quad (5)$$

Figure 3:
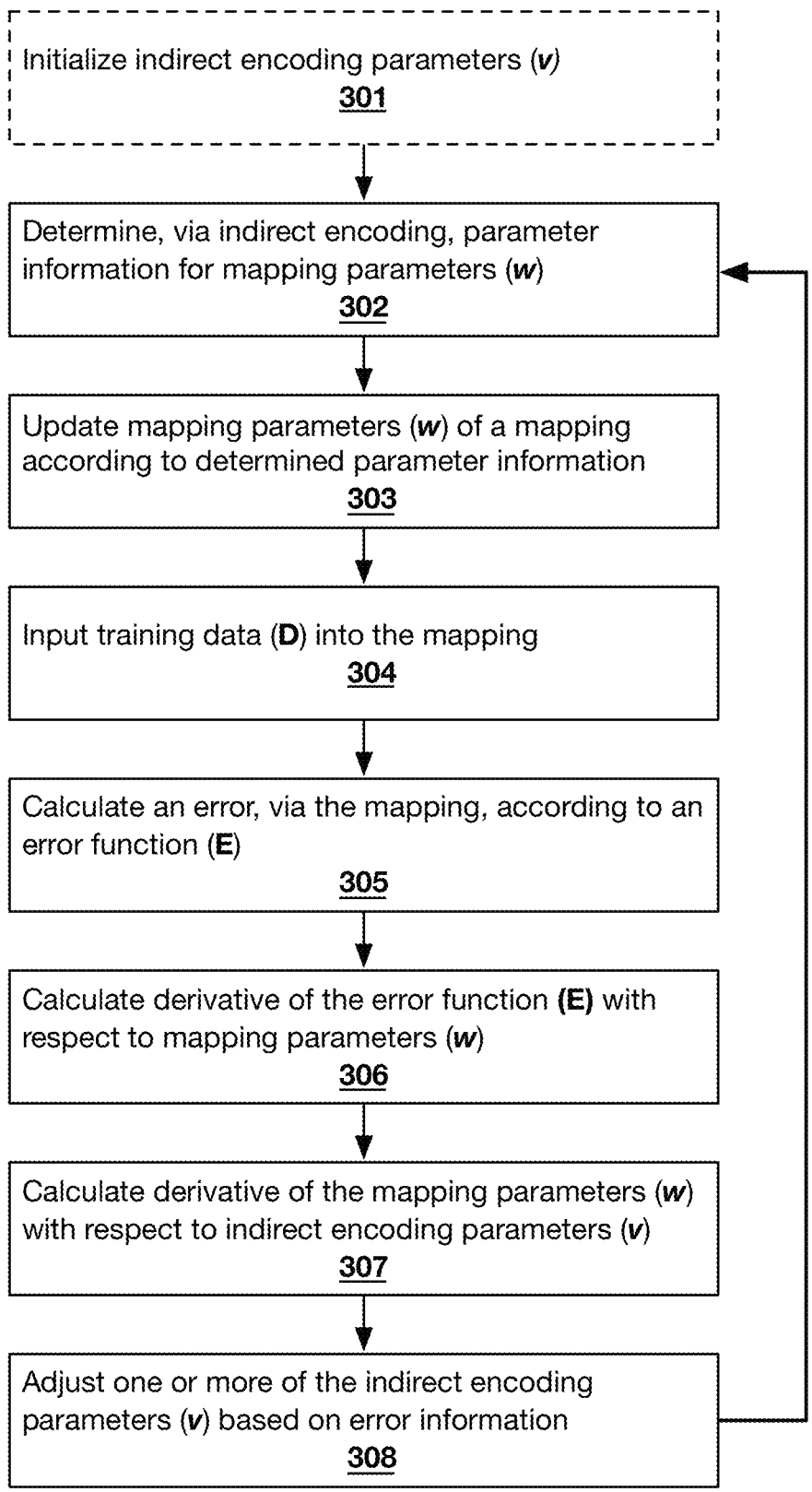
FIG. 3 shows a flow diagram for the learning of an indirect encoding of a mapping in order to optimize the mapping, according to an exemplary embodiment.

Referring to FIG. 3 an exemplary flow diagram for the learning of an indirect encoding g (with parameters v) of a mapping with parameters w is illustrated. The exemplary method allows for determining mapping parameters w of a mapping y=f(x,w) by employing and learning an indirect encoding w=g(z,v) to encode one or more of such mapping parameters.

As described below, it has surprisingly been found that indirect encodings of mappings may be efficiently learned by propagating error information from the mapping back to the indirect encoding. In certain embodiments, indirect encoding parameters of the indirect encoding may be learned by, for example, smoothly reducing an error metric using analytically or numerically computed or approximated first and higher-order derivatives of the error with respect to the indirect encoding parameters.

As shown, exemplary methods may comprise an initialization step 301, wherein a value is assigned to each of the indirect encoding parameters of an indirect encoding by any appropriate means. For example, the indirect encoding parameters may be initialized with randomly assigned values. As another example, the parameter values may be initialized deterministically, based on the mapping to be learned and/or prior knowledge about the particular problem being solved. As yet another example, the parameters may be initialized using a learning procedure from data.

At step 302, relationship information may be provided as input to the indirect encoding such that mapping parameter information may be calculated for one or more mapping parameters to be encoded. The inputted relationship information may comprise location information corresponding to one or more mapping parameters to be encoded, e.g., intrinsic coordinates of such mapping parameters within the mapping.

Upon receiving relationship information, the indirect encoding may calculate parameter information for one or more mapping parameters w, based on the received relationship information and the values assigned to the indirect encoding parameters. As discussed above, unique parameter information may be determined for one, some, or all mapping parameters in the mapping, as desired or required. It will be appreciated that parameter information may comprise a numerical value, such as a positive number, a negative number or zero.

In a less preferred embodiment, initial assignment of mapping parameter values (i.e., initialization) may be completed using a manual or automatic process that does not require information from the indirect encoding. For example, the mapping parameters may be initialized with randomly assigned values. As another example, the mapping parameter values may be initialized deterministically, based on prior knowledge about the particular problem being solved. As yet another example, the parameters may be initialized using a learning procedure from data.

At step 303 one or more mapping parameters may be updated, based on the parameter information calculated by the indirect encoding. In certain embodiments, such updating of a mapping parameter may comprise replacing any value assigned to the mapping parameter with the corresponding parameter information (i.e., another value). Alternatively, such updating may comprise adding, multiplying, interleaving, and/or combining the determined parameter information and the mapping parameter.

Once the mapping parameters have been updated, training data D may be input into the mapping 304 to determine an output. An error (i.e., error value) is then computed 305, based on an error function, the training data, and the updated mapping parameters. As discussed above, the error may represent a discrepancy between an output y' of the mapping and a correct or expected output y. For example, the error may represent an empirical loss (i.e., sum of losses) of the training data set for a mapping, e.g., as shown in Equation (1) above.

Any of a number of available error functions may be compatible with the techniques described herein. For example, versions that include regularization terms that prevent overfitting to the training data, versions derived from likelihoods or posteriors of probabilistic models, versions that are based on sub-sampling data sets, versions where the error is defined from a reinforcement learning, sequence learning, or control problem, versions where the error is used to perform auto-encoding or other forms of unsupervised learning, or other surrogate loss functions. Generally, the error may be computed either on the entire training data D or, as is usual in neural network training, may be approximated by computing the error on a small sub-sample (or mini-batch) of the training data D.

No matter the exact form of the error function, the error generally depends on the output of the mapping E(y). Using the above example, the form of the error is $E(y(z_3, z_4))$.

It will be appreciated that the term "error function," as used herein, is meant to include both functions to be minimized and functions to be maximized (i.e., objective functions). One of ordinary skill will recognize that similar concepts apply to learning mappings in order to maximize a function or minimize a function; such problems are considered to be equivalent. In certain embodiments, the indirect encodings may utilize error information corresponding to the error function, such as but not limited to, error derivative information. Such error derivative information may relate to: (1) changes in the error E as a function of the mapping parameters w; and/or (2) changes in the mapping parameters w as a function of the indirect encoding parameters v. The error derivative information may comprise, for example, first order derivatives, second order derivatives and/or higher order derivatives. Exemplary indirect encoding techniques advantageously make use of such error derivative information so as to learn indirect mappings (i.e., minimize or maximize the error) in a convergent manner.

At step 306, derivative information may first be determined relating to the change in the error E as a function of the mapping parameters w. Such derivative information, in turn, depends on the parameters v of the indirect encoding g, as in w=g(z,v). Accordingly, the change in the error with respect to the indirect encoding parameters may be calculated according to Equation (6), below.

$$\frac{\partial E}{\partial v} = \frac{\partial E}{\partial y} \frac{\partial y}{\partial w} \frac{\partial w}{\partial v} \quad (6)$$

The first term in Equation (6), $\partial E/\partial y$, is the derivative of the error itself. This first term will depend on the form of the error function and, for example, the training targets y.

At step 307, derivatives of the mapping parameters w may be computed with respect to the indirect encoding parameters v. This is shown by the third term in Equation (6), $\partial w/\partial v$, which is also the derivative of the indirect encoding g with respect to its parameters v.

Additional derivation of the second term in Equation (6) ∂y/∂w, requires further explanation, since w is in general a function. If we consider the special case where the parameters w are independent weights in a neural network, then this term can be computed using the backpropagation algorithm. For convenience, for the case where w is a function, the second and third terms in Equation (6) may be computed together, simplifying the derivation.

In the context of the above example, the symbol a may be used to denote everything inside the sigmoid in Equation (4), which results in y=σ(a). For examples where σ is the logistic function, the derivative of y with respect to a is:

$$\frac{\partial y}{\partial a} = \sigma(a)\sigma(-a)$$

This result is used below, but it will be appreciated that it may be generalized to any other differentiable nonlinearity as:

$$\frac{\partial y}{\partial a} = \sigma'(a)$$

Replacing the order of the integrals and derivatives, as follows, allows for the derivative of the indirect encoding mapping g to be computed inside the integral.

$$\frac{\partial y}{\partial v} = \frac{\partial \sigma(a)}{\partial a}\frac{\partial a}{\partial v} =$$

$$\sigma(a)\sigma(-a)\frac{\partial a}{\partial v} = \sigma(a)\sigma(-a)\int\int \frac{\partial w(z_1, z_2, z_3, z_4)}{\partial v}x(z_1, z_2)dz_1dz_2$$

Accordingly, replacing the integral by a sum over discrete units, as in Equation (5), above, allows for the computation of the sum of the derivatives over all inputs nodes x. For example, in the discrete case in Equation (5), the derivative of a particular unit $y_{kl}$ with respect to the indirect encoding parameters v can be computed as:

$$\frac{\partial y_{kl}}{\partial v} = \sigma(a_{kl})\sigma(-a_{kl})\sum_{i,j}\frac{\partial w(z_1^i, z_2^j, z_3^k, z_4^l)}{\partial v}x_{ij}$$

where:

$a_{kl} = \Sigma_{i,j} w(z_1^i, z_2^j, z_3^k, z_4^l)x_{ij}$.

In one special case where the indirect encoding depends only on the differences between coordinates z, as in Equation (7), below, the indirect encoding may implement generalized convolutions.

$$w(z_1,z_2,z_3,z_4) \equiv \tilde{w}(z_3-z_1,z_4-z_2) \quad (7)$$

A 2D convolution is formally defined as:

$y(z_3,z_4) = \partial\partial \tilde{w}(z_3-z_1,z_4-z_2)x(z_1,z_2)dz_1dz_2$ where x is being convolved with a kernel w̃. The fact that indirect encodings can generalize the convolution operation performed by convolutional neural networks is important since such networks are a very widely used architecture for neural networks.

A modulated convolution may also be defined. For example, the following equation describes a convolution modulated as a function of input coordinates $z_1$ and $z_2$:

$w(z_3-z_1,z_4-z_2,z_1,z_2)$

Accordingly, indirect encodings learned using the procedures herein described can be employed to generalize the mappings represented in a convolutional neural network.

At step 308, error information is employed to adjust one or more of the indirect encoding parameters v. Such error information may include, but is not limited to, an error value (e.g., as determined by comparing an output of the mapping to an expected output), a form of an error function used to determine the error value, and/or error derivative information relating to the error function (e.g., a derivative of the error function with respect to one or more indirect encoding parameters of the indirect encoding).

In preferred embodiments, the computed derivative information of the error E with respect to the indirect encoding parameters v is employed to adjust the indirect encoding parameters, via any algorithm that uses derivatives for optimization. For example, such adjustments may be made according to one or more of the following algorithms: steepest gradient descent, stochastic gradient descent with mini-batches, algorithms that use variable adaptive step-sizes, $\eta_t$, second-order derivatives, approximations thereof and/or combinations thereof.

The adjusted indirect encodings may now be employed to update the one or more mapping parameters, as detailed above with respect to steps 302 and 303. Accordingly, one or more of the above steps may be repeated to adjust the indirect encoding and update the mapping, as desired or required, to learn an optimized mapping for a given data set.

It will be appreciated that the above described process (or any subset thereof) may be repeated until a stopping criterion is reached. The stopping criterion may be any function that depends on the error or other performance measure computed on the training data D or other (e.g. validation) data augmented to potentially include regularization terms, and the computational time budget. In its simplest form, the stopping criterion may comprise a number of runs through the above-described process steps or a subset thereof.

Figure 4:
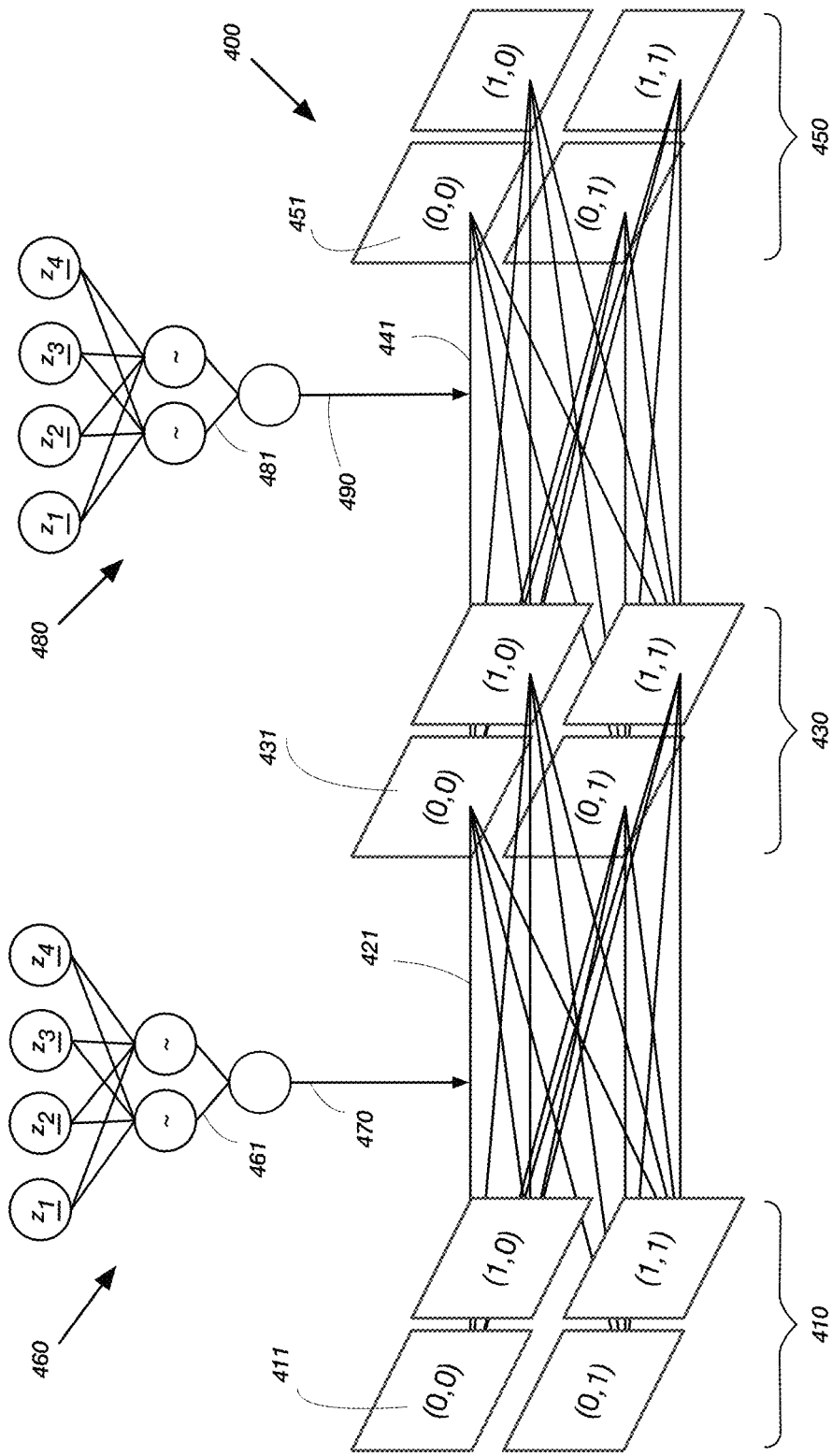
FIG. 4 shows an exemplary embodiment wherein a plurality of indirect encodings encode a plurality of mapping parameters of a multi-layer neural network.
Figure 5:
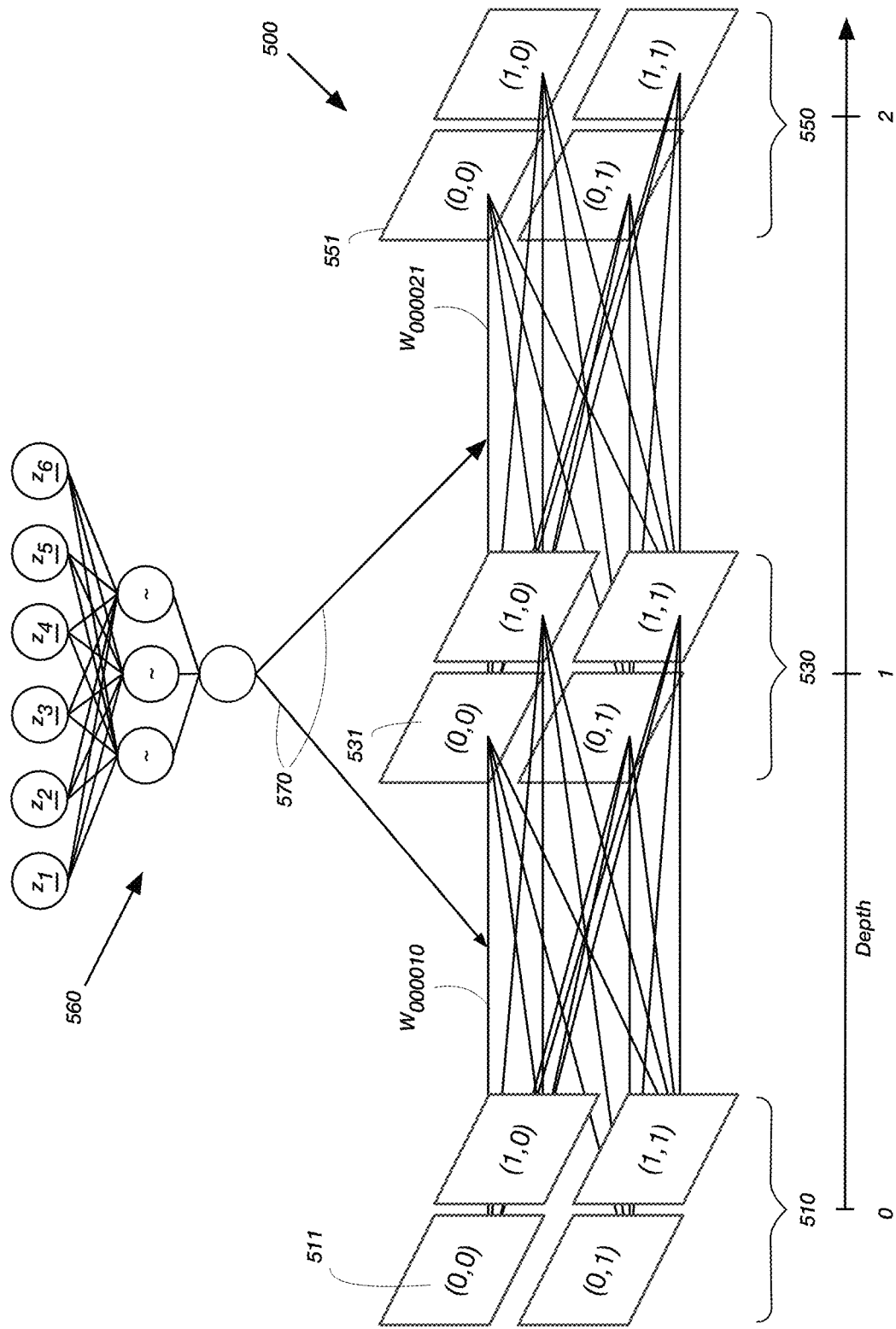
FIG. 5 shows an exemplary embodiment wherein a single indirect encoding encodes multiple mapping parameters of a multi-layer neural network.

Referring to FIG. 4 and FIG. 5, the learnable indirect encodings of this specification may be employed in any number of configurations, including deeply layered and recursive variants. Moreover, such encodings may encode any number of learnable mappings, having a variety of configurations.

FIG. 4 illustrates a plurality of indirect encodings encoding mapping parameters of a mapping. As shown, the mapping 400 comprises a conventional neural network having a number of layers, including an input layer 410, a hidden layer 430 and an output layer 450. Each layer comprises one or more units (e.g., 411, 431, and 451, respectively) that receive an input from each unit in the next lowest layer in the sequence.

As shown, a first indirect encoding 460 encodes one or more of the mapping parameters 421 connecting the input layer 410 to the first hidden layer 430. And a second indirect encoding 480 encodes each of the mapping parameters 441 connecting the hidden layer 430 to the output layer 450. Each of the first indirect encoding 460 and second indirect encoding 480 may calculate parameter information (470 and 490, respectively) in order to update corresponding mapping parameters.

Generally, each layer of a mapping having L layers may be encoded via a different indirect encoding, such that:

$$y=f(x)=f_L(f_{L-1} \ldots (f_1(x,w_1) \ldots ,w_{L-1}),w_L)$$

where, for each layer l=1, ..., L, $$w_l=g_l(z_l,v_l).$$

One skilled in the art will recognize that the procedure disclosed above with respect to FIG. 3, can be extended to such deeply layered systems by taking derivatives through each of the L indirect encodings to learn the indirect encoding parameters $v_1, \ldots, v_L$ (461, 481). Accordingly, each of steps 302 through 308 may be performed for each set of mapping parameters $w_l$ and corresponding indirect encoding parameters $v_l$ reusing computations where appropriate.

Referring to FIG. 5, an alternative indirect encoding configuration is illustrated. As shown, a single indirect encoding 560 encodes each of the mapping parameters of a multi-layer neural network mapping 500. For example, the indirect encoding 560 encodes: one or more mapping parameters connecting units 511 in the input layer 510 to units 531 in the hidden layer 530 (e.g., $w_{000010}$); and one or more mapping parameters connecting units 531 in the hidden layer 530 to units 551 in the output layer 550 (e.g., $w_{000021}$).

Generally, multiple layers of a mapping having L layers may be indirectly encoded via a single indirect encoding g that produces a vector of L outputs. This is represented as follows:

$$w_l=g_l(z,v).$$

For example, the basic structure of a two-layer neural network with inputs x, hidden layer $h_1$ and outputs y would be as follows, assuming that inputs and outputs are functions of some coordinates z (e.g. if the inputs and outputs are images and z defines pixel coordinates):

$$h_1(z_3,z_4)=\sigma(\iint w_1(z_1,z_2,z_3,z_4)x(z_1,z_2)dz_1dz_2)$$

$$y(z_5,z_6)=\sigma(\iint w_2(z_3,z_4,z_5,z_6)h_1(z_3,z_4)dz_3dz_4).$$

The exemplary indirect encoding is configured to receive and consider mapping parameter location information comprising a depth of an input unit and/or an output unit corresponding to one or more mapping parameters to be encoded.

As shown, each unit in the mapping may be assigned a scalar depth (e.g., between 0 and 1) and such depth coordinate may be passed to the indirect encoding 560 along with other mapping parameter location information. In certain embodiments, the input layer is assigned a depth of 0; the output layer is assigned a depth of 1; and the hidden layers are assigned increasing depths within that interval (e.g., equally-spaced throughout the interval). For convenience, the illustrated embodiment shows the input layer 510 as having a depth of 0, the hidden layer 530 as having a depth of 1, and the output layer 550 as having a depth of 2.

Using this configuration, one or more mapping parameters may be indirectly encoded as a function of input and output unit positions and depths. In this way, each mapping parameter in a mapping may be specified to an indirect encoding as a single function of unit coordinates, no matter how deep the mapping.

For example, if each unit is specified by two dimensions representing its position within an array, and a third dimension specifying its depth in the overall mapping, then a mapping parameter connecting any two such units can be specified by a 6-dimensional function, $w(z_1, z_2, z_3, z_4, z_5, z_6)$, where $(z_1, z_2)$ and $(z_3, z_4)$ are the positions and $(z_5, z_6)$ are the depths of the corresponding input and output units.

In this way, a single indirect encoding can learn one, some, or all layers of a multi-layered mapping, such as a deep neural network, by application of the above described process relating to FIG. 3.

In one particular embodiment, a neural network may be trained so as to minimize an error measure of distance (such as squared distance) between the output y and the input x, so as to provide an indirectly encoded autoencoder. An autoencoder is a mapping from the input to a reconstruction of the same inputs, here denoted x and y respectively, where the goal of autoencoding is to learn a usually more compact representation of the inputs, here denoted at $h_1$. In the continuous setting, for example, squared distance can be computed as follows over some bounded region Z:

$$E(y,x)=\int_z (y(z)-x(z))^2 dz.$$

Such an indirectly encoded autoencoder system could learn a hidden representation $h_1$ of the data. The learning procedure for an indirectly encoded autoencoder applies the procedure disclosed in FIG. 3 as described above, but where the data set comprises pairs of inputs and targets that are equal to the inputs. By making the hidden layer $h_1$ in the mapping smaller than the input and target layers, the autoencoder can learn a compact representation, which can be used for other learning tasks or to compress data for efficient data transmission.

In another embodiment, a recursive indirect encoding variant may be provided having multiple levels of indirect encodings. This may be obtained by allowing w=g(z,v) to provide a first indirect encoding and, in turn, representing the parameters of the first indirect encoding using another indirect encoding v=h(q,u) with parameters u. The procedure described above can be extended to learn the parameters u or at any higher level.

Although for simplicity the above examples depict feed-forward neural networks (i.e., networks without cyclical paths), one skilled in the art will recognize that any of these layering methods also can easily encode mapping parameters for recurrent networks (i.e. networks with cyclical paths). For such recurrent networks, gradient descent methods such as backpropagation through time and other variants, including algorithms designed for specific recurrent architectures such as LSTMs and GRUs may be applied for training.

It will be appreciated that the illustrated mappings, including the pictured neural networks, are simply exemplary, and the techniques described throughout the specification are equally applicable to mappings comprising any number of components, layers and/or types of layers. For example, the techniques may be applied to multi-layer perception and variants including deep networks, recurrent networks, and many other architectures. See, e.g., LeCun et. al, Deep learning. *Nature*, 521:436-444, 2015 (incorporated by reference herein in its entirety). Exemplary applicable neural networks include those comprising layer-types such as, but not limited to, fully-connected layers, max-pooling layers, convolutional layers, regularization layers, and so on.

Moreover, although the inputs and outputs are each depicted as 2D arrays, the techniques described herein are equally applicable to input/output arrays having any higher dimension (e.g., voxels in a 3D scan) or lower dimension (e.g., 1D array representing possible labels of an image or possible words from a vocabulary of words).

It will be further appreciated that the above described techniques are not at all limited to neural networks. The indirect encodings and/or the mappings may be functions defined with any other learnable method, including for example kernel machines such as support vector machines and Gaussian processes or deep Gaussian processes, logistic regression or other statistical regression methods, decision trees and random forests, rule-based systems learned by inductive logic-programming or by other means, and probabilistic models defined in terms of a graphical model or probabilistic programs.

The indirect encodings described herein provide a number of technical advantages over direct encodings and currently available indirect encodings. Unlike conventional direct encodings, the number of parameters in an indirect encoding need not grow exponentially with the size of the input and/or output arrays. Because the number of parameters in the indirect encoding can stay fixed, it is possible to learn mappings of arrays at arbitrarily high resolution. In other words, having learned a small network, it is possible to immediately generalize to larger networks (e.g., image-to-image mappings can be learned from low-resolution images and then will generalize to higher resolution images). Conversely, having learned a large network, it can be immediately generalized to a smaller compressed network.

Moreover, such indirect encodings can represent lawful relations in the data, which may be useful for one or more of: learning geometric transformation invariance in visual data, rules in linguistic data, and/or patterns of behavior in decision-making problems. The indirect encoding allows the representation of underlying structure in the mapping (i.e., a regularity in a mapping), and may aid in extrapolation or generalization to new, unseen data.

Additionally, the disclosed indirect encoding techniques can be used to represent a large number of parameters of a mapping in a compressed manner (i.e., using a smaller number of parameters), which can aid in regularization to avoid overfitting, in learning from small data sets, in storing mappings (e.g. neural networks) on devices with memory limitations, and in speed of execution of predictions at test time.

The flexibility of the described techniques gives rise to a number of substantial technical advantages, including but not limited to: dramatically smaller computer memory usage; faster training (i.e., less processing time (CPU or GPU) required to achieve the same learning test performance); lower sample complexity (i.e., less data required to learn the mapping); and/or resolution-independent learning (i.e. training on arrays with particular resolution does not constrain the network from then making use of arrays of different and arbitrarily large or small resolutions).

The indirect encodings and methods of learning mappings using the same, as described in this specification, may be used in any number of machine learning tasks. For example, the disclosed indirect encoding techniques may be useful in efficiently training systems for: capturing associations or discovering regularities within a set of patterns (i.e., pattern recognition), such as for facial or optical character recognition; time series predictions (e.g., weather, stock market and/or movement projections); signal process (e.g., filtering audio signals); control (e.g., determining steering or gameplay decisions); processing input data from a number of soft sensors; and/or anomaly detection. Other examples include, but are not limited to, sales forecasting, industrial process control, customer research, data validation, risk management, target marketing, recognition of speakers in communications, medical diagnosis, recovery of telecommunications from faulty software, interpretation of multi-meaning words, weapons detection, texture analysis, 2D or 3D object recognition, hand-written word recognition, facial recognition, object modelling, resource allocation, scheduling and/or database mining.

Embodiments of the subject matter and the functional operations described in this specification can be implemented in one or more of the following: digital electronic circuitry; tangibly-embodied computer software or firmware; computer hardware, including the structures disclosed in this specification and their structural equivalents; and combinations thereof. Such embodiments can be implemented as one or more modules of computer program instructions encoded on a tangible non-transitory program carrier for execution by, or to control the operation of, data processing apparatus (i.e., one or more computer programs). Program instructions may be, alternatively or additionally, encoded on an artificially generated propagated signal (e.g., a machine-generated electrical, optical, or electromagnetic signal) that is generated to encode information for transmission to suitable receiver apparatus for execution by a data processing apparatus.

And the computer storage medium can be one or more of: a machine-readable storage device, a machine-readable storage substrate, a random or serial access memory device, and combinations thereof.

As used herein, the term "data processing apparatus" comprises all kinds of apparatuses, devices, and machines for processing data, including but not limited to, a programmable processor, a computer, and/or multiple processors or computers. Exemplary apparatuses may include special purpose logic circuitry, such as a field programmable gate array ("FPGA") and/or an application specific integrated circuit ("ASIC"). In addition to hardware, exemplary apparatuses may comprise code that creates an execution environment for the computer program (e.g., code that constitutes one or more of: processor firmware, a protocol stack, a database management system, an operating system, and a combination thereof).

The term "computer program" may also be referred to or described herein as a "program," "software," a "software application," a "module," a "software module," a "script," or simply as "code." A computer program may be written in any form of programming language, including compiled or interpreted languages, or declarative or procedural languages, and it can be deployed in any form, including as a standalone program or as a module, component, subroutine, or other unit suitable for use in a computing environment. Such software may correspond to a file in a file system. A program can be stored in a portion of a file that holds other programs or data. For example, a program may include one or more scripts stored in a markup language document; in a single file dedicated to the program in question; or in multiple coordinated files (e.g., files that store one or more modules, sub programs, or portions of code). A computer program can be deployed and/or executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as but not limited to an FPGA and/or an ASIC.

Computers suitable for the execution of the one or more computer programs include, but are not limited to, general purpose microprocessors, special purpose microprocessors, and/or any other kind of central processing unit ("CPU"). Generally, CPU will receive instructions and data from a read only memory ("ROM") and/or a random access memory ("RAM"). The essential elements of a computer are a CPU for performing or executing instructions and one or more memory devices for storing instructions and data. Generally, a computer will also include, or be operatively coupled to receive data from or transfer data to, or both, one or more mass storage devices for storing data (e.g., magnetic, magneto optical disks, and/or optical disks). However, a computer need not have such devices. Moreover, a computer may be embedded in another device, such as but not limited to, a mobile telephone, a personal digital assistant ("PDA"), a mobile audio or video player, a game console, a Global Positioning System ("GPS") receiver, or a portable storage device (e.g., a universal serial bus ("USB") flash drive).

Computer readable media suitable for storing computer program instructions and data include all forms of nonvolatile memory, media and memory devices. For example, computer readable media may include one or more of the following: semiconductor memory devices, such as erasable programmable read-only memory ("EPROM"), electrically erasable programmable read-only memory ("EEPROM") and/or and flash memory devices; magnetic disks, such as internal hard disks or removable disks; magneto optical disks; and/or CD-ROM and DVD-ROM disks. The processor and the memory can be supplemented by, or incorporated in, special purpose logic circuitry.

To provide for interaction with a user, embodiments may be implemented on a computer having any type of display device for displaying information to a user. Exemplary display devices include, but are not limited to one or more of: projectors, cathode ray tube ("CRT") monitors, liquid crystal displays ("LCD"), light-emitting diode ("LED") monitors and/or organic light-emitting diode ("OLED") monitors. The computer may further comprise one or more input devices by which the user can provide input to the computer. Input devices may comprise one or more of: keyboards, a pointing device (e.g., a mouse or a trackball). Input from the user can be received in any form, including acoustic, speech, or tactile input. Moreover, feedback may be provided to the user via any form of sensory feedback (e.g., visual feedback, auditory feedback, or tactile feedback). A computer can interact with a user by sending documents to and receiving documents from a device that is used by the user (e.g., by sending web pages to a web browser on a user's client device in response to requests received from the web browser).

Embodiments of the subject matter described in this specification can be implemented in a computing system that includes one or more of the following components: a backend component (e.g., a data server); a middleware component (e.g., an application server); a frontend component (e.g., a client computer having a graphical user interface ("GUI") and/or a web browser through which a user can interact with an implementation of the subject matter described in this specification); and/or combinations thereof. The components of the system can be interconnected by any form or medium of digital data communication, such as but not limited to, a communication network. Non-limiting examples of communication networks include a local area network ("LAN") and a wide area network ("WAN"), e.g., the Internet.

The computing system may include clients and/or servers. The client and server may be remote from each other and interact through a communication network. The relationship of client and server arises by virtue of computer programs running on the respective computers and having a client-server relationship to each other.

EXAMPLE

An experiment was conducted to determine performance of a mapping employing the indirect encoding techniques described herein. Specifically, the performance of a conventional neural network having a LeNet type architecture was compared to that of the same network trained via an indirect encoding.

Figure 6:
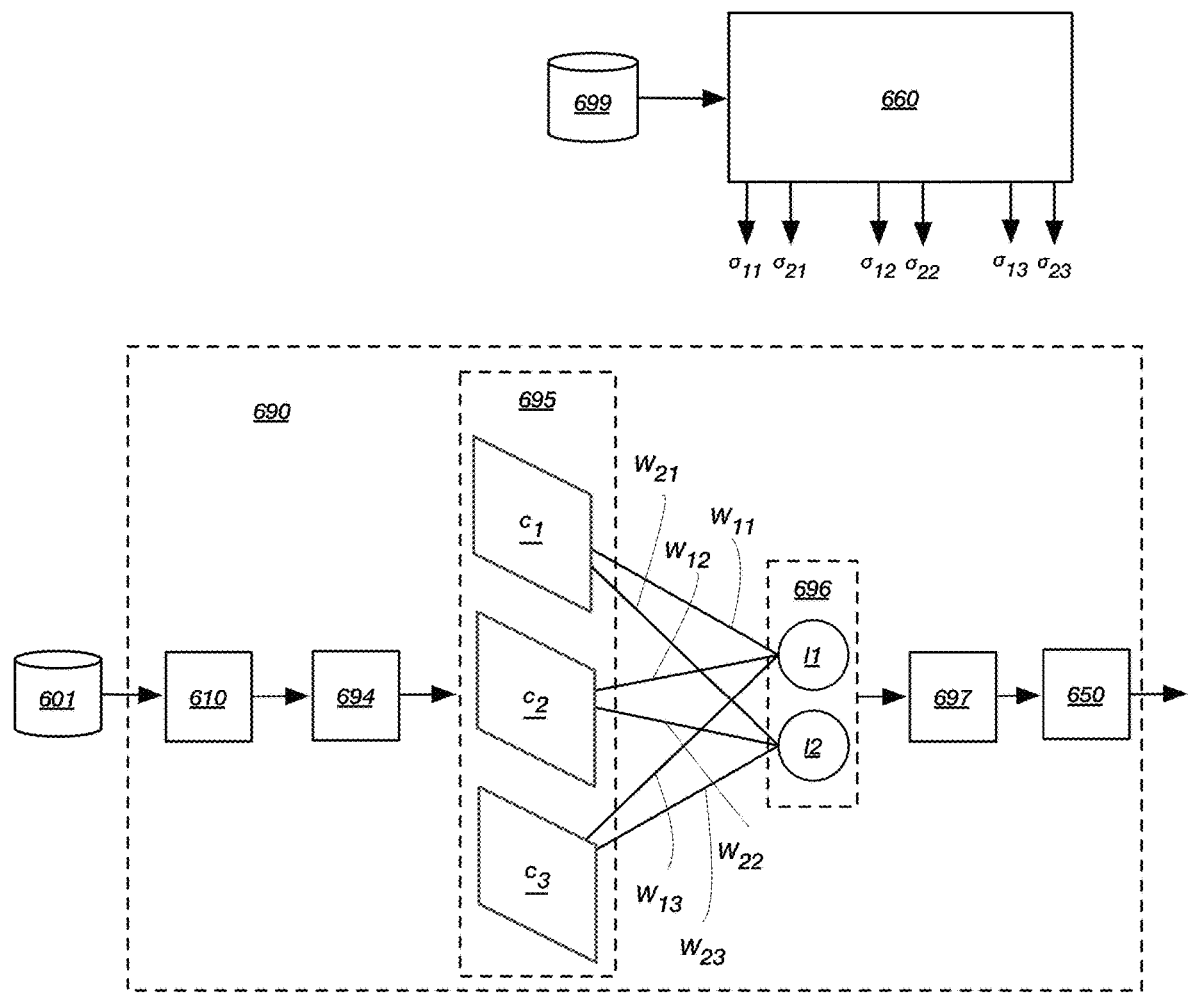
FIG. 6 shows an exemplary embodiment wherein mapping parameters connecting a convolutional layer to a linear layer in a mapping having a LeNet-type architecture are indirectly encoded.

An exemplary LeNet mapping 690 is illustrated in FIG. 6. As shown, the mapping 690 comprises an input layer 610, one or more convolutional layers (694, 695), one or more linear layers (696, 697) and an output layer 650 (i.e., a classification layer). LeNet architectures are well-known in the art.

In a first test, a mapping 690 was initialized by assigning random values to each of the mapping parameters throughout the mapping. A set of training data 601 consisting of 28×28 images of handwritten digits from the MNIST database was then inputted to the mapping, an error was determined, and the mapping parameters were updated according to the Adagrad optimization method. This process was repeated for each image in a first set of training data.

As shown in Table 1, below, the performance of this system was determined on test data, according to the above described process, for a number of training data sets having different numbers of images. In total, eight training sets were evaluated, where the sets contained 48, 94, 188, 375, 750, 1500, 3000 and 6,000 images per class, respectively.

In a second test, an indirect encoding 660 was employed to encode a number of the mapping parameters of the conventional mapping 690. As shown in FIG. 6, a number of mapping parameters ($w_{11}$, $w_{21}$, $w_{12}$, $w_{22}$, $w_{13}$, $w_{23}$) connect convolutional layer 695 to linear layer 696, where the convolution layer 695 comprises a set of feature maps (e.g., $c_1$, $c_2$, $c_3$) and each feature map represents a 2D, 7×7 array of pixel values (note that two pooling layers were used (not shown), resulting in feature maps one-fourth the size of the original input).

The illustrated mapping parameters ($w_{11}$, $w_{21}$, $w_{12}$, $w_{22}$, $w_{13}$, $w_{23}$) each represent an array of parameters corresponding to connections between each unit in a given feature map ($c_1$, $c_2$, $c_3$) in the convolutional layer 695 and a given unit ($l_1$, $l_2$) in the linear layer 696. For example, mapping parameter $w_{21}$ represents an array of mapping parameters connecting each of the units in feature map $c_1$ to unit $l_2$ in the linear layer 696. Accordingly, each of the illustrated mapping parameters represents an array of 49 parameters connecting a given 7×7 feature map to a unit in the linear layer.

The test began with initialization of the indirect encoding 660 and the mapping 690. Random values were assigned to each of the indirect encoding parameters (not shown) and each of the mapping parameters.

Relationship information 699 was then input into the indirect encoding 660 in order to determine parameter information (e.g., $\sigma_{11}$, $\alpha_{21}$, $\sigma_{12}$, $\sigma_{22}$, $\sigma_3$, $\sigma_{23}$) for the mapping parameters to be encoded (e.g., $w_{11}$, $w_{21}$, $w_{12}$, $w_{22}$, $w_{13}$, $w_{23}$). More specifically, information corresponding to each mapping parameter's location in the feature maps ($c_1$, $c_2$, $c_3$) was inputted. Thus, 49 sets of (x,y) inputs were inputted to the indirect encoding 660 to generate parameter information ($\sigma_{11}$, $\sigma_{21}$, $\sigma_{12}$, $\sigma_{22}$, $\sigma_{13}$, $\sigma_{23}$) corresponding to the mapping parameters ($w_{11}$, $w_{21}$, $w_{12}$, $w_{22}$, $w_{13}$, $w_{23}$).

Next, the encoded mapping parameters were updated according to the parameter information generated by the indirect encoding. For example, each of the parameters in mapping parameter $w_{11}$ was assigned a value according to parameter information $\sigma_{11}$.

As with test 1, a set of training data 601 consisting of 28×28 images of handwritten digits from the MNIST database was then inputted to the mapping 690 and an error was determined based on an error function.

Next, the derivative of the error function was determined with respect to the mapping parameters and the indirect encoding parameters. This error derivative information was then employed to adjust the indirect encoding parameters according to the Adagrad optimization method, which results in the update of the mapping parameters between the convolutional layer 695 and the linear layer 696. The remainder of the mapping parameters in the conventional architecture were updated using the error derivative information and the Adagrad optimization method as discussed above. This process was repeated for each image in a first set of training data.

As shown in Table 1, below, the test set performance of this system was determined, according to the above described process, for a number of training data sets having different numbers of images. In total, eight training sets were evaluated, where the sets contained 48, 94, 188, 375, 750, 1500, 3000 and 6,000 images per class, respectively.

TABLE 1

| Samples (#) | Conventional Mapping (% Error) | Encoded Mapping (% Error) |
| --- | --- | --- |
| 48 | 7.779 | 4.302 |
| 94 | 4.903 | 2.938 |
| 188 | 3.416 | 2.129 |
| 375 | 2.576 | 1.669 |
| 750 | 1.796 | 1.239 |
| 1500 | 1.424 | 0.980 |
| 3000 | 1.053 | 0.753 |
| 6000 | 0.797 | 0.647 |

Figure 7:
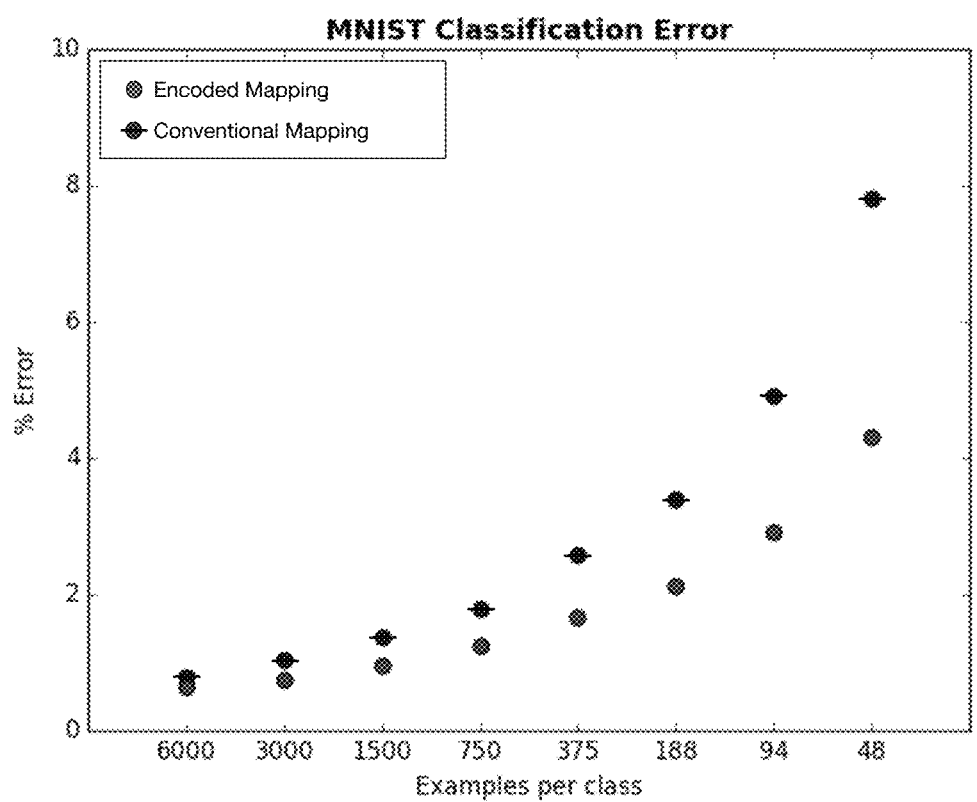
FIG. 7 shows a chart illustrating classification performance of a conventional mapping and an indirectly encoded mapping.

As may be seen in Table 1 and in the chart shown in FIG. 7, the indirectly encoded mappings outperform conventional mappings in MNIST classification, for any given amount of training data. In fact, when trained with large data sets, indirectly encoded mappings have been shown to perform MNIST classification at error percentages as low as 0.19%—the lowest error percentage ever achieved.

Moreover, it has surprisingly been found that the indirectly encoded mappings generally perform such classification tasks as well as (or better) than conventional mappings trained with twice as much training data. In other words, the indirectly encoded mappings require only half the training data to perform at a given error percentage, as compared to conventional mappings.

Various embodiments are described in this specification, with reference to the detailed discussed above, the accompanying drawings, and the claims. Numerous specific details are described to provide a thorough understanding of various embodiments. However, in certain instances, well-known or conventional details are not described in order to provide a concise discussion. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the embodiments.

The embodiments described and claimed herein and drawings are illustrative and are not to be construed as limiting the embodiments. The subject matter of this specification is not to be limited in scope by the specific examples, as these examples are intended as illustrations of several aspects of the embodiments. Any equivalent examples are intended to be within the scope of the specification. Indeed, various modifications of the disclosed embodiments in addition to those shown and described herein will become apparent to those skilled in the art, and such modifications are also intended to fall within the scope of the appended claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

All references including patents, patent applications and publications cited herein are incorporated herein by reference in their entirety and for all purposes to the same extent as if each individual publication or patent or patent application was specifically and individually indicated to be incorporated by reference in its entirety for all purposes.

We claim:

1. A computer-implemented method comprising:
   accessing a neural network configured to receive as input, an input digitally encoded array and output an output digitally encoded array; and
   training the neural network by repeatedly performing steps comprising:
   determining, via an indirect encoding, parameter information corresponding to a mapping parameter of a neural network, based on received relationship information;
   updating the mapping parameter, based on the determined parameter information;
   calculating, via the neural network, an output, based on received input data and the updated mapping parameter;
   determining an error value of the output, the error value based on an error function and an expected output;

determining a derivative of the error value of the output with respect to one or more mapping parameters of the neural network;

determining a derivative of the mapping parameters with respect to the indirect encoding parameters; and optimizing the indirect encoding parameters of the indirect encoding by propagating error information from the output of the neural network to the indirect encoding, the optimizing comprising adjusting one or more indirect encoding parameters by a factor comprising a product of derivative of the error value of the output with respect to the one or more mapping parameters of the neural network and the derivative of the mapping parameters with respect to the indirect encoding parameters of the indirect encoding.

2. The method according to claim 1, wherein the indirect encoding comprises one of a neural network, a probabilistic model, a generalized convolution, or another learned function.

3. The method according to claim 2, wherein the neural network is a Compositional Pattern Producing Network ("CPPN").

4. The method according to claim 2, wherein the indirect encoding comprises a neural network.

5. The method according to claim 1, wherein the neural network is one of a feedforward neural network, a recurrent neural network, an autoencoder, a generative neural network, a recognition neural network, a Bayesian neural network, a spiking neural network, a convolutional neural network, or combinations thereof.

6. The method according to claim 1, wherein the neural network comprises a first unit connected to a second unit via the mapping parameter.

7. The method according to claim 1, wherein the relationship information comprises mapping parameter location information, mapping geometry information, input data information, task information, or combinations thereof.

8. The method according to claim 1, wherein said relationship information comprises mapping parameter location information comprising a location of an input to the mapping parameter, a location of an output of the mapping parameter, a position of a layer to which the mapping parameter is associated, a position of a filter to which the mapping parameter is associated, or combinations thereof.

9. The method according to claim 1, wherein said updating of the mapping parameter comprises adding, multiplying, interleaving, replacing or combining the determined parameter information and the mapping parameter.

10. The method according to claim 1, wherein said adjusting employs one or more techniques comprising backpropagation, steepest gradient descent, Stochastic gradient descent, Stochastic gradient descent with mini-batches, algorithms that use variable adaptive step-sizes, first-order derivatives, second-order derivatives, approximations thereof, or combinations thereof.

11. The method according to claim 10, wherein said adjusting employs backpropagation of the error derivative information through the indirect encoding.

12. The method according to claim 1, wherein:
the indirect encoding comprises a neural network;
the neural network comprises a first layer and a second layer;
the first layer and the second layer comprise a number of units, each unit comprising an activation function;
the first layer units and the second layer units are connected via a connectivity pattern; and wherein the method further comprises adjusting the connectivity pattern or the activation function of at least one of the units.

13. The method according to claim 12, wherein Bayesian optimization methods are employed to adjust the activation function or the connectivity pattern.

14. The method according to claim 1, wherein the input digitally encoded array represents an image and the output digitally encoded array represents another image.

15. The method according to claim 1, wherein the input digitally encoded array represents an image and the output digitally encoded array represents labels of the image.

16. The method according to claim 1, wherein the input digitally encoded array the output digitally encoded array store words from a vocabulary of words.

17. The method according to claim 1, wherein the input digitally encoded array is a higher dimensional array and the output digitally encoded array is a lower dimensional array compared to the input digitally encoded array.

18. A system comprising one or more computers and one or more storage devices storing instructions that when executed by the one or more computers cause the one or more computers to perform operations comprising:
accessing a neural network configured to receive as input, an input digitally encoded array and output an output digitally encoded array; and
training the neural network by repeatedly performing steps comprising:
determining, via an indirect encoding, parameter information corresponding to a mapping parameter of a neural network, based on received relationship information relating to the neural network;
updating the mapping parameter, based on the determined parameter information;
calculating, via the neural network, an output, based on received input data and the mapping parameter;
determining an error value of the output, the error value based on an error function and an expected output;
determining a derivative of the error value of the output with respect to one or more mapping parameters of the neural network;
determining a derivative of the mapping parameters with respect to the indirect encoding parameters; and
optimizing the indirect encoding parameters of the indirect encoding by propagating error information from the output of the neural network to the indirect encoding, the optimizing comprising adjusting one or more indirect encoding parameters by a factor comprising a product of derivative of the error value of the output with respect to the one or more mapping parameters of the neural network and the derivative of the mapping parameters with respect to the indirect encoding parameters of the indirect encoding.

19. The system according to claim 18, wherein the relationship information is one of mapping parameter location information, mapping geometry information, input data information, task information, and combinations thereof.

20. The system according to claim 18, wherein said relationship information comprises mapping parameter location information selected from the group consisting of: a location of an input to the mapping parameter, a location of an output of the mapping parameter, a position of a layer to which the mapping parameter is associated, a position of a filter to which the mapping parameter is associated, and combinations thereof.

21. The system according to claim 18, wherein said updating of the mapping parameter comprises adding, multiplying, interleaving, replacing or combining the determined parameter information and the mapping parameter.

22. The system according to claim 18, wherein said adjusting employs one or more techniques comprising: backpropagation, steepest gradient descent, Stochastic gradient descent, Stochastic gradient descent with mini-batches, algorithms that use variable adaptive step-sizes, first-order derivatives, second-order derivatives, approximations thereof and combinations thereof.

23. The system according to claim 22, wherein said adjusting employs backpropagation of the error derivative information through the indirect encoding.

24. The system according to claim 18, wherein the input digitally encoded array represents an image and the output digitally encoded array represents another image.

25. The system according to claim 18, wherein the input digitally encoded array represents an image and the output digitally encoded array represents labels of the image.

26. The system according to claim 18, wherein the input digitally encoded array the output digitally encoded array store words from a vocabulary of words.

27. The system according to claim 18, wherein the input digitally encoded array is a higher dimensional array and the output digitally encoded array is a lower dimensional array compared to the input digitally encoded array.

28. A computer program product encoded on one or more non-transitory computer storage media, the computer program product comprising instructions that when executed by one or more computers cause the one or more computers to perform operations comprising:
   accessing a neural network configured to receive as input, an input digitally encoded array and output an output digitally encoded array; and
   training the neural network by repeatedly performing steps comprising:
      determining, via an indirect encoding, parameter information corresponding to a mapping parameter of a mapping, based on received relationship information relating to the mapping;
      updating the mapping parameter, based on the determined parameter information;
      calculating, via the mapping, an output, based on received input data and the mapping parameter;
      determining an error value of the output, the error value based on an error function and an expected output;
      determining a derivative of the error value of the output with respect to one or more mapping parameters of the mapping;
      determining a derivative of the mapping parameters with respect to the indirect encoding parameters; and
      optimizing the indirect encoding parameters of the indirect encoding by propagating error information from the output of the neural network to the indirect encoding, the optimizing comprising adjusting one or more indirect encoding parameters by a factor comprising a product of derivative of the error value of the output with respect to the one or more indirect encoding parameters of the indirect encoding.

29. The computer program product according to claim 28, wherein the relationship information comprises one or more of: mapping parameter location information, mapping geometry information, input data information, task information, and combinations thereof.

30. The computer program product according to claim 28, wherein said relationship information comprises mapping parameter location information comprising: a location of an input to the mapping parameter, a location of an output of the mapping parameter, a position of a layer to which the mapping parameter is associated, a position of a filter to which the mapping parameter is associated, and combinations thereof.

31. The computer program product according to claim 28, wherein said updating of the mapping parameter comprises adding, multiplying, interleaving, replacing or combining the determined parameter information and the mapping parameter.

32. The computer program product according to claim 28, wherein said adjusting employs one or more techniques comprising: backpropagation, steepest gradient descent, Stochastic gradient descent, Stochastic gradient descent with mini-batches, algorithms that use variable adaptive step-sizes, first-order derivatives, second-order derivatives, approximations thereof and combinations thereof.

33. The computer program product according to claim 32, wherein said adjusting employs backpropagation of the error derivative information through the indirect encoding.

34. The computer program product according to claim 28, wherein the input digitally encoded array represents an image and the output digitally encoded array represents another image.

35. The computer program product according to claim 28, wherein the input digitally encoded array represents an image and the output digitally encoded array represents labels of the image.

36. The computer program product according to claim 28, wherein the input digitally encoded array the output digitally encoded array store words from a vocabulary of words.

37. The computer program product according to claim 28, wherein the input digitally encoded array is a higher dimensional array and the output digitally encoded array is a lower dimensional array compared to the input digitally encoded array.

* * * * *